J. E. HEINTZ.
DISK BEARING.
APPLICATION FILED SEPT. 23, 1919.
1,339,455.
Patented May 11, 1920.
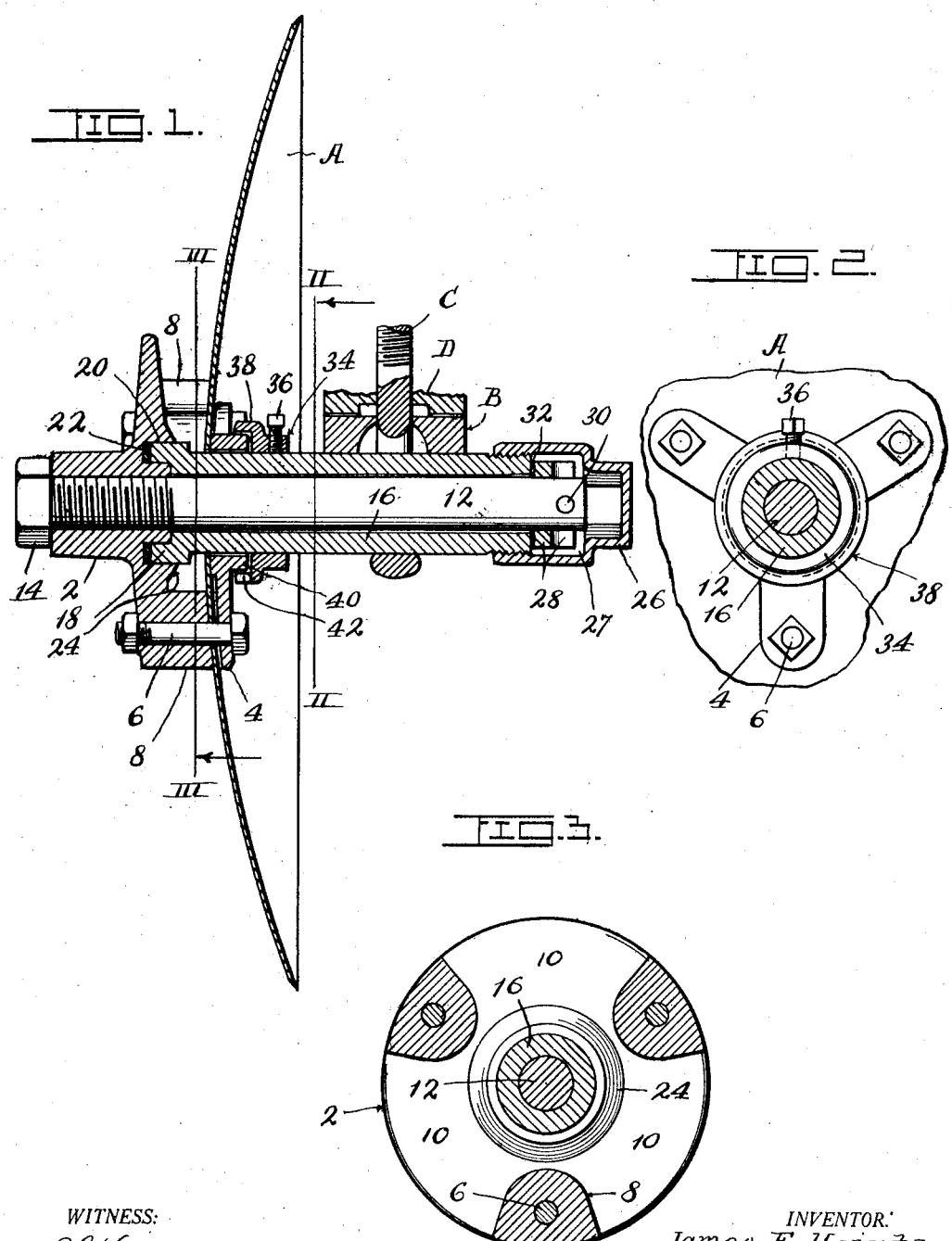
WITNESS:
RCHamilton
INVENTOR:
James E. Heintz,
BY
F. G. Fischer,
ATTORNEY.

UNITED STATES PATENT OFFICE.

JAMES E. HEINTZ, OF ELKHART, KANSAS.

DISK-BEARING.

1,339,455. Specification of Letters Patent. Patented May 11, 1920.

Application filed September 23, 1919. Serial No. 325,701.

*To all whom it may concern:*

Be it known that I, JAMES E. HEINTZ, a citizen of the United States, residing at Elkhart, in the county of Morton and State of Kansas, have invented certain new and useful Improvements in Disk-Bearings, of which the following is a specification.

My invention relates to cultivator disks and pertains more particularly to bearings for such disks.

One object is to provide a construction whereby a longer and more durable bearing is obtained than heretofore.

A further object is to provide a bearing which is practically dirt and dust tight and has outlets for the escape of such foreign matter should it get into the interior of the bearing. A further object is to provide a dust proof chamber to exclude foreign matter and hold a lubricant for the working parts of the bearing.

Other objects will hereinafter appear, and in order that the invention may be fully understood, reference will now be had to the accompanying drawing, in which:

Figure 1 is a vertical central section of a cultivator disk provided with the bearing.

Fig. 2 is a broken cross section on line II—II of Fig. 1.

Fig. 3 is a broken cross section on line III—III of Fig. 1.

A designates the disk which is of usual form. Said disk is provided with a hub consisting of members 2 and 4 arranged at opposite sides of the disk and rigidly connected together by suitable means, such as bolts 6. The main portion of the member 2 is spaced from the adjacent side of the disk A by integral lugs 8 to leave openings 10 for the exit of any dust, dirt or other foreign matter which might find its way into the interior of the bearing.

The hub member 2 is threaded or otherwise firmly secured to an axle 12, which when threaded into the hub member as shown, is provided with a lock-nut 14 to prevent it from accidentally unscrewing and getting loose.

The axle 12 is journaled in an elongated tubular bearing 16 which extends through axial openings in the hub member 4 and the disk A, and is provided with an enlarged annular terminal 18 which fits within a corresponding annular groove 20 in the hub member 2.

A suitable gasket 22 is interposed between the adjacent ends of the terminal 18 and the groove 20 to prevent passage of dust and other foreign matter into the interior of the bearing 16 through the joint formed by said adjacent ends of the hub member 2 and the terminal 18. The gasket 22 is assisted in excluding foreign matter from the joint by a deflector 24 of truncated conical form integral with the inner end of the hub member 2 and overlapping the enlarged terminal 18 of the bearing 16. Foreign matter is prevented from entering the opposite end of the bearing 16 by a cap 26 having a lubricant chamber 27 to contain a suitable lubricant for the axle 12 and the interior of the bearing 16.

The bearing 16 is held in position upon the axle 12 by the hub member 2 and a collar 28, which latter is inclosed in the cap 26 and secured to the adjacent end of the axle 12 by suitable means, such as a pin 30. A washer 32 is interposed between the collar 28 and the adjacent end of the bearing 16 to relieve these parts of undue wear.

Dust and other foreign matter is prevented from entering between the hub member 4 and the bearing 16 by a cap 34, secured to the bearing 16 by suitable means, such as a set screw 36, and having an annular flange 38 overlapping the annular portion 40 of the hub member 4. Should foreign matter enter between the bearing 16 and the annular portion 40 of the hub member 4, it has two avenues of escape, one through an opening 42 at the lower portion of the cap 34, and the other through the openings 10 in the hub member 2.

In practice, only one cap 34 is necessary owing to the fact that the pressure of the dirt is against the concave side of the disk A, and hence only tends to enter between the right end of the hub member 4 and the bearing 16.

The bearing 16 is held from rotating with the axle 12 by the usual clamp consisting of a circular member B and an eye-bolt C, which latter extends upwardly through and is secured to the adjacent end of the usual arm D attached to the cultivator frame.

From the foregoing description it is apparent that I have produced a bearing containing the advantages above pointed out, and while I have shown the preferred embodiment of the invention, I reserve the right to make such changes in the construction, proportion and arrangement of parts, as properly fall within the spirit and scope of the claims.

Having thus described my invention, what I claim and desire to secure by Letters Patent, is:

1. In combination with a disk, a stationary tubular bearing, an axle journaled in said bearing, a hub consisting of two members one of which is secured to the concaved side of the disk, the other being secured to the convexed side of the disk and the axle, and spacing means with intervening openings on the last-mentioned hub member to hold the main portion thereof from the disk.

2. In combination with a disk, a stationary tubular bearing, an axle journaled in said bearing, a hub consisting of two members one of which is secured to the concaved side of the disk and has a reduced annular portion, the other being secured to the convexed side of the disk and the axle, and a cap secured to the bearing and having an annular flange overlapping the annular portion of the first hub member, said flange being provided at its under portion with an outlet opening, substantially as described.

3. In combination with a disk, a stationary tubular bearing having an enlarged annular terminal, an axle journaled in said bearing, and a hub secured to the disk and the axle and having an annular groove to receive the enlarged annular terminal of the bearing, and a deflector on said hub and overlapping the enlarged annular terminal of the bearing, for the purpose described.

4. In combination with a disk, a stationary tubular bearing having an enlarged annular terminal, an axle journaled in said bearing, a hub consisting of two members one of which is secured to the concaved side of the disk, the other being secured to the convexed side of the disk and the axle and having an annular groove to receive the enlarged annular terminal of the bearing, and spacing means with intervening openings in the last-mentioned hub member to hold the main portion thereof from the disk.

5. In combination with a disk, a stationary tubular bearing having an enlarged annular terminal, an axle journaled in said bearing, a hub secured to the disk and the axle and having an annular groove to receive the enlarged annular terminal of the bearing, a deflector on said hub and overlapping the enlarged annular terminal of the bearing, and a cap removably-secured to the opposite end of the bearing and containing a lubricant chamber.

6. In combination with a disk, a stationary tubular bearing, an axle journaled in said bearing, a hub consisting of two members one of which is secured to the concaved side of the disk, the other being secured to the convexed side of the disk and the axle, spacing means with intervening openings on the last mentioned hub member to hold the main portion thereof from the disk, a washer secured to the opposite end of the axle from that engaging the hub, a thrust washer interposed between said collar and the adjacent end of the bearing, a cap inclosing the collar and the adjacent ends of the axle and the bearing and containing a lubricant chamber, and a cap secured to the bearing and having an annular flange overlapping a portion of the first-mentioned hub member, said flange having an opening at its under portion, for the purpose described.

In testimony whereof I affix my signature, in the presence of two witnesses.

JAMES E. HEINTZ.

Witnesses:
S. C. SMALL,
J. A. KENNEDY.